United States Patent
Boga et al.

(10) Patent No.: US 7,569,265 B2
(45) Date of Patent: Aug. 4, 2009

(54) SEAL STRIP FOR A SUCTION ROLL

(75) Inventors: Wayne Boga, Chinchilla, PA (US);
Steve Sennett, Beloit, WI (US)

(73) Assignee: Metso Paper, Inc., Helsinki (FI)

( * ) Notice: Subject to any disclaimer, the term of this patent is extended or adjusted under 35 U.S.C. 154(b) by 908 days.

(21) Appl. No.: 10/774,084

(22) Filed: Feb. 6, 2004

(65) Prior Publication Data

US 2004/0168603 A1 Sep. 2, 2004

Related U.S. Application Data

(60) Provisional application No. 60/448,558, filed on Feb. 19, 2003.

(30) Foreign Application Priority Data

Feb. 17, 2003 (FI) .................................. 20035018

(51) Int. Cl.
- B32B 7/02 (2006.01)
- B32B 27/32 (2006.01)
- D21F 3/10 (2006.01)

(52) U.S. Cl. ..................... 428/212; 428/220; 162/371; 162/369; 277/407; 277/944

(58) Field of Classification Search ................ 428/212, 428/220; 101/494; 162/371, 369, 374; 277/407, 277/944, 946

See application file for complete search history.

(56) References Cited

U.S. PATENT DOCUMENTS

| | | | | | |
|---|---|---|---|---|---|
| 3,139,375 | A | * | 6/1964 | Bryand | 162/371 |
| 3,975,333 | A | * | 8/1976 | Schubart et al. | 525/332.7 |
| 4,014,730 | A | * | 3/1977 | Selover et al. | 156/307.3 |
| 4,401,716 | A | * | 8/1983 | Tschudin-Mahrer | 428/317.3 |
| 4,956,226 | A | * | 9/1990 | Ashizawa et al. | 428/323 |
| 4,983,355 | A | | 1/1991 | Alfons | |
| 5,358,163 | A | * | 10/1994 | Naka | 226/95 |
| 5,876,566 | A | * | 3/1999 | Frawley, Jr. | 162/374 |
| 6,258,409 | B1 | * | 7/2001 | Sale et al. | 427/285 |
| 6,436,241 | B1 | * | 8/2002 | Persson et al. | 162/371 |

FOREIGN PATENT DOCUMENTS

| | | |
|---|---|---|
| CN | 1092796 | 9/1994 |
| DE | 257265 | 6/1988 |
| JP | 50000100 | 1/1975 |

\* cited by examiner

*Primary Examiner*—David R Sample
*Assistant Examiner*—Lawrence D Ferguson
(74) *Attorney, Agent, or Firm*—Stiennon & Stiennon

(57) ABSTRACT

The invention relates to a suction roll seal strip and a method for manufacturing it from a mixture, which mostly consists of nitrile rubber and graphite. A seal blank is formed from the mixture and hardened at a chosen temperature. The mixture to be hardened includes wax.

13 Claims, 2 Drawing Sheets

SEAL STRIP FOR A SUCTION ROLL

CROSS REFERENCES TO RELATED APPLICATIONS

This application claims priority on Finnish Application No. 20035018, filed Feb. 17, 2003, and provisional application 60/448,558, filed Feb. 19, 2003, the disclosures of which are incorporated by reference herein.

STATEMENT AS TO RIGHTS TO INVENTIONS MADE UNDER FEDERALLY SPONSORED RESEARCH AND DEVELOPMENT

Not applicable.

FIELD OF THE INVENTION

The present invention relates to an improved seal strip for a suction roll, which is manufactured by hardening an extruded mass into a shape, most of the mass being polymer and graphite. The invention also relates to a method for manufacturing the seal strip.

BACKGROUND OF THE INVENTION

Suction rolls are used particularly in paper machines, to remove water from the paper web. The suction roll has a perforated shell and a stationary suction box inside, so that the part of the jacket next to it is subjected to suction. The seal, i.e. the seal strip is arranged in a holder in the structure of the suction box, this generally being a U-shaped holder, in the bottom of which, and possibly on the sides of which there are loading hoses, for pressing the seal initially against the shell. Later, the suction holds the seal against the shell.

The suction box, which is elongated in the longitudinal direction of the roll, is bounded by long side seals, the first of which, i.e. the seal strip on the wet side, is narrower than the second, i.e. the seal strip on the dry side. In addition, there are ends seals at the ends of the suction box, set at a small gap from the shell. U.S. Pat. No. 5,746,891 discloses the seal construction of one such suction roll.

Seal wear has become a quite important problem. In addition, the noise and loss of power caused by the seals are important factors. Though wear resistance is thus a primary requirement in seals, a low noise output and power demand would also be desirable properties.

Seal strips, seals in brief, are of vulcanized rubber-graphite compounds. The typical configuration of a seal strip is a continuous piece, which is the same length as the suction box (3-12 m). Multi-piece seal strips exist, but these require special machining and installation. The material wears during operation and must be replaced at relatively frequent intervals. The nature of the material is that it is a rigid, brittle structure. The seals are sent to the mill in rigid containers with space for the entire length of the strip. The length and rigidity of the package result in considerable shipping and storage costs. The brittleness of the seal material results in a lowered yield in manufacturing and breakages during shipping and installation.

During operation, the seal strips are loaded against the inner shell of the roll by means of so-called loading hoses. Though the flexibility of the loading means permits some alignment of the seal strip from end to end, the rigidity of the seal strip prevents local conformity with the roll shell. Therefore all irregularities due to the manufacture of the shell, or deflection can be compensated for only with the aid of wear. As the seal is intended to be a critical element, its useful life is shortened.

The most common material for constructing a seal strip is a vulcanized rubber-graphite compound. It is used in the vast majority of rolls today.

Publication U.S. Pat. No. 5,649,719 (Beloit) discloses the use of graphite impregnated with resin for the manufacture of a suction roll seal strip. Publication U.S. Pat. No. 4,714,523; Sawyer, discloses a seal-strip construction, in which a PTFE strip is set inside a graphite strip, in order to improve its sliding properties. Publication U.S. Pat. No. 4,915,787 (Cline Company) discloses a seal-strip construction, in which a long seal strip is formed from short pieces, the ends of which are specially shaped to form overlapping joints between the strips. Publication U.S. Pat. No. 5,876,566 (Appleton) discloses a seal strip, which is formed from nitrile rubber, graphite, carbon black, PTFE, and optionally phenol resin. U.S. Pat. No. 2,893,487 (Beloit) discloses a suction-box solution, in which, in the rearward seal strip, grooving is formed against the shell on the trailing edge of the strip. This reduces the detrimental effects, such as noise, of a sudden change in pressure.

A combination of graphite and rubber is desirable because it provides good lubricating properties, does not wear excessively in normal operation, and is easy to manufacture. It can be manufactured in all the lengths required by papermaking equipment.

All rubber graphite seals strips are made in the following manner:

A rubber graphite mixture is milled to an acceptable consistency for extrusion

The compound is extruded to the approximate shape of the end product, or of a part product The shaped strips are vulcanized to the final rigid condition The rigid strips are machined to their final shape.

Fundamentally, all rubber graphite strips have the same physical characteristics, are made the same way, and perform similarly. They are all limited by shipping and handling constraints, due to their rigid and brittle nature.

The usual vulcanizing temperature is about 150° C. and the processing time is 3 hours. Additives are used, for instance, to create a suitable chemical structure in the end product. Certain additives, for example, sulphur, affect the number of carbon links. Some additives act as accelerating agents.

Other materials have been tried as seal strips, but none have been as successful are rubber graphite.

SUMMARY OF THE INVENTION

The present invention is intended to create an improvement over the known seals.

Accordingly, a suction roll seal strip, which is manufactured from a mixture, which mostly consists of nitrile rubber and graphite, is characterized in that the mixture includes wax. The amount of wax in the mixture is set in such a way that the flexibility of the seal strip permits it to be bent onto a reel, the radius of which is less than 130 cm.

A method for manufacturing a suction roll seal strip from a mixture, which mostly consists of nitrile rubber and graphite, and from which mixture a seal blank is formed, which is hardened at a chosen temperature, is characterized in that the mixture to be hardened includes wax. In a specific embodiment the amount of wax is 1-15%, preferably 2-4%. The amounts of nitrile rubber and graphite are within the ranges: nitrile rubber 30-60% volume, and graphite 30-60% volume.

The method is characterized in that the hardening temperature is in the range 140-160° C., preferably in the range 145-155°, and the hardening time is in the range 3-5 hours. The mass includes 1-15% sulphur or peroxide and the graphite used is natural graphite. Alternatively, the graphite used is synthetic graphite.

The method can be further characterized in that the melting point of the wax used is more than 100° C., preferably within the range 110-150° C.

The amount of wax is arranged to create flexibility in the seal strip, which will permit it to be rolled onto a reel with a radius of less than 1.5 m.

The seal strip according to the invention is so flexible that it can be rolled up. Besides flexibility, the invention gives a seal quieter operation and reduces the power it requires. Shipping and handling damage is reduced, as the material is less brittle than previously.

These and other features and advantages of the invention will be more fully understood from the following detailed description of the invention taken together with the accompanying drawings.

DETAILED DESCRIPTION OF THE INVENTION

Figure 1:
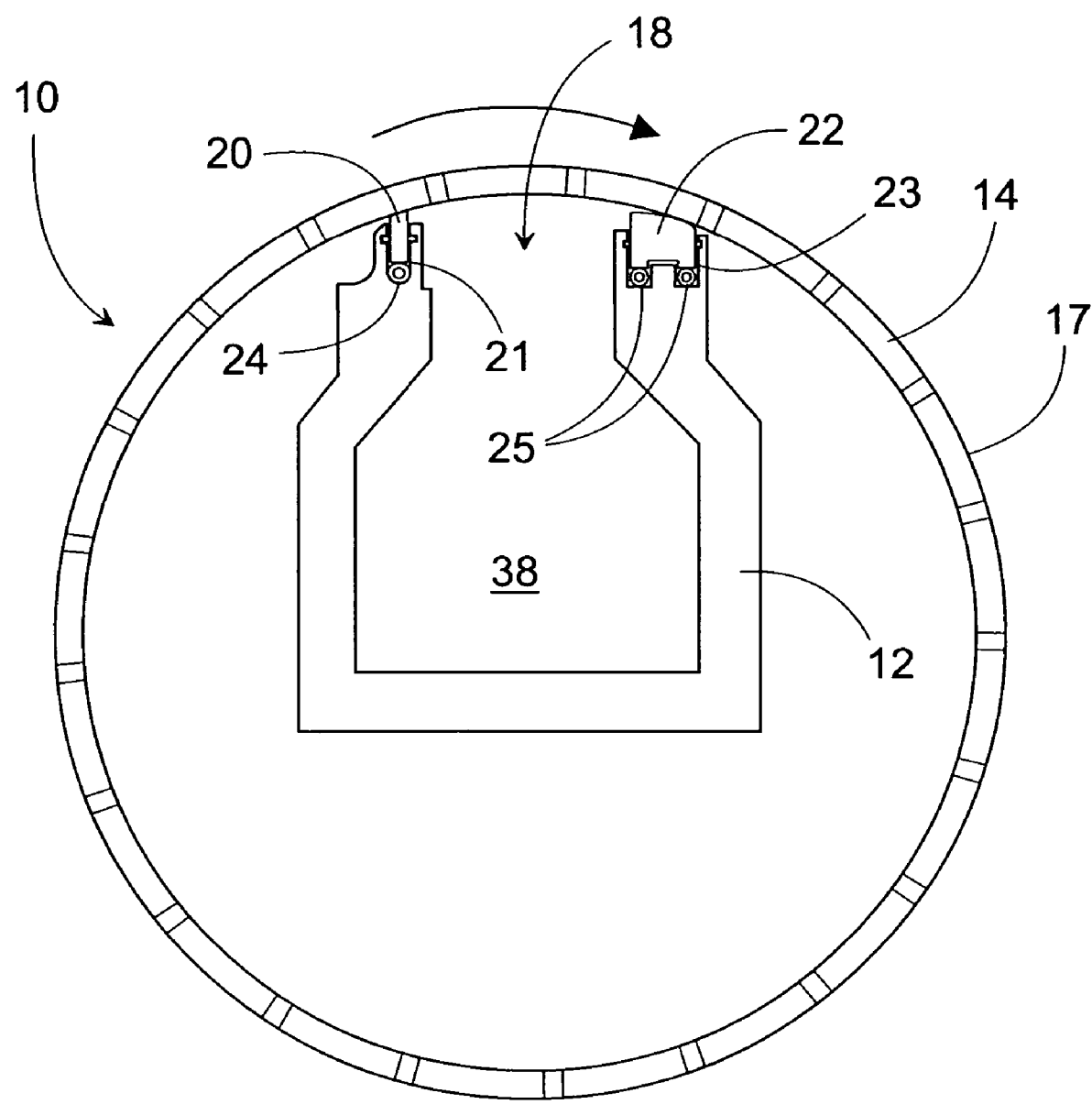
FIG. 1 shows a schematic view of the construction of a suction box.

With reference to FIG. 1, the reference number 10 indicates a general view of a suction-box arrangement in a paper machine. This includes a stationarily supported suction box 12 located inside a perforated cylindrical roll 14, which rotates around the suction box 12. The cylindrical roll 14 has an inner surface 16 and an outer surface 17 and it is manufactured from, bronze, stainless steel, or a similar material. The suction box 12 has a gap opening 18 against the cylindrical roll 14, with U-shaped gaps 21 and 23, in practice particularly holders, in which seal strips 20 and 22 are placed, at both of its edges. The latter of these is generally the wider. The seal strips 20, 22 are loaded from below by corresponding loading hoses 24 and 25. The seal strips 20 and 22 wipe against the inner surface of the cylindrical roll 14 as it rotates.

The inner part of the suction box 12 is connected to a vacuum source (not shown), so that a suction effect acts on the inner surface 16 of the cylindrical roll 14 in the area of the gap 18. The seal strips 20 and 22 extend over the length of the suction box 12 (thus covering the width of the web being dried) while there are special end seals (not shown) at the ends of the suction box 12.

Previously, the following recipe, for example, was used in the manufacture of the mass:

EXAMPLE 1

|  | % weight |
|---|---|
| a) Polymer Nipol N612B | 20 |
| b) Nipol 1312 Liquid Rubber | 10 |
| a and b have together 30% acrylonitrile rubber | |
| stearic acid | 0.6 |
| magnesium oxide | 1.5 |
| graphite | 56 |
| accelerator MBTS | 0.4 |
| sulphur | 12 |

The mass was mixed, ground carefully, and extruded through a mould, to create a strip blank. The blank was transferred to an autoclave, in which the processing lasted for 3 hours at 150° C. During processing, the chemical reactions were completed. The result obtained from the mould was a somewhat flexible solid piece (density 1.63 g/cm$^3$), which was transported fully extended, because the strip, with a cross-section of about 1.9×4.8 cm, could not be bent to a practicable curve.

In the invention, an solution to the shipping and storage problems of seal strips has been sought, as these are mainly due to the rigidity of the known strips. These problems are solved by using a new seal material, in which the following substances are used (as % volumes):

|  | relative specific gravity |
|---|---|
| NBR rubber 30-60%, preferably 40-50% | 0.98 |
| Graphite 30-60%, preferably 40-50% | 2.25 |
| Wax 1-20%, preferably 2-6% | 0.97 |

It is advantageous to use small amounts of known auxiliary substances and additives. These include vulcanizing agents, such as sulphur; accelerating agents, such as peroxides; stabilizing agents, such as stearic acid; machining agents, such as MgO and ZnO.

In one manufacturing series according to the invention, the following recipe was used:

EXAMPLE 2

|  | % weight | PHR | % volume |
|---|---|---|---|
| NBR rubber | 28 | 100 | 45 |
| graphite | 66 | 235 | 46 |
| wax | 3 | 10.5 | 4.5 |
| vulcanizing agent | 3 | 10 | 4.5 |

PBR = parts per hundred parts rubber

The product was extruded, vulcanized, and machined in a known manner. The vulcanizing temperature was 150° C., the processing time being 3 hours. At a lower temperature the reactions are slower and at a higher temperature faster, which in turn affects the processing time.

In the composition of the basic material, there is NBR rubber (acrylonitrile rubber), which is a copolymer of butadiene and acrylonitrile. The NBR rubber used in the example was Nipol N612B, Zeon Chemicals. The graphite used in the example was synthetic, but it can also be natural graphite.

The following table gives the most usual sizes of seal strips and their bending radii

|  | size (cm) | minimum bending radius (cm) |
|---|---|---|
| Example 1 | 1.9 × 4.76 | infinite |
| (prior art) | 7 × 4.76 | infinite |
| Example 2 | 1.9 × 4.76 | 30-100 |
| (invention) | 2 × 4.1 | 30-100 |
|  | 7 × 4.76 | <130 |
|  | 7 × 4.4 | <130 |

The essential new component is wax, which is preferably N, N'-ethylene bis-stearamide wax, for example, Advawax, Rohm & Haas, or Acrawax C, Lonza, or some other corresponding EBS wax (ethylene bis-stearamide wax), or some other bis-stearamide wax, or hydroxy stearamide wax, or hydroxy bis-stearamide waxes. Other synthetic or natural waxes, for example, carnauba wax, esparto wax, etc. can also be considered. Examples of synthetic waxes, in addition to those aforementioned, are polyolefin waxes and other amide waxes. A suitable wax should have a high melting point of more than 100° C., preferably in the range 110-150° C.

The wax significantly increases the flexibility of the product. A seal of the same size as that above (1.9×4.8 cm, density 1.59) can be bent to a relatively small curvature (R=30 cm) and the product can be formed into a reel, for example, for shipping. As a general rule, enough wax is used for the flexibility of the seal strip to be sufficient for shipping (bending onto a reel, in which the radius R<1.5 m). Even larger seal strips manufactured using the recipe according to the invention meet this criterion.

The use of synthetic graphite makes the seal anisotropic. The graphite is preferably used in the form of flakes or crystals.

The vulcanizing agent used in the example was Vulcup 40KE, Hercules, T-butylperoxy-diisopropyl benzene, but other vulcanizing peroxides, along with sulphur, can also be considered. Reactor accelerators, for example, thiazols such as benzothiazyl sulphide (e.g., MBTS, Vulkacit DM, Akrochem), or n-cyclohexylbenzo thiazyl sulphamide (Santocure MOR, Monsanto) can be used.

The seal strip (FlexSeal) manufactured using the method according to the invention was compared in several tests with known commercially available seal strips.

Figure 2:
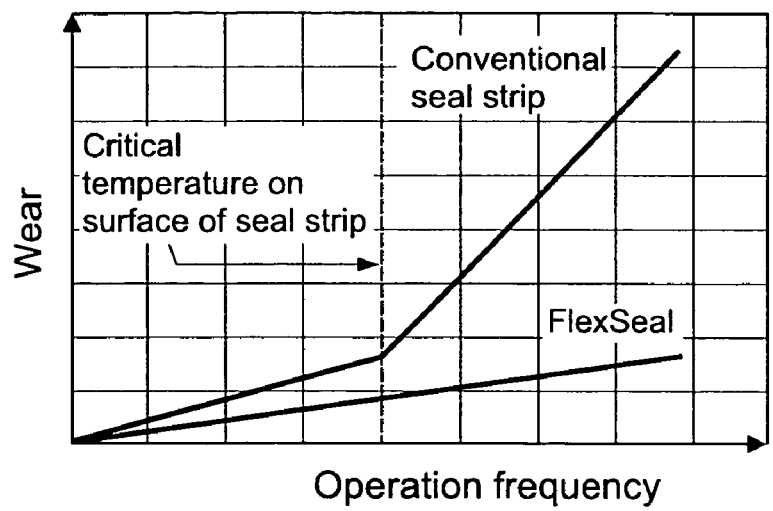
FIG. 2 shows a comparison of the wear in a conventional seal strip and in a seal strip (FlexSeal) according to the invention.

According to FIG. 2, the seal according to the invention wears relatively less than a conventional seal strip. As loading increases, the seal strip according to the invention behaved reliably compared to a conventional seal strip, which was observed to show a sudden increase in wear at a specific loading, if the loading increased further. The seal according to the invention has low wear in both wet and dry conditions.

Figure 3A:
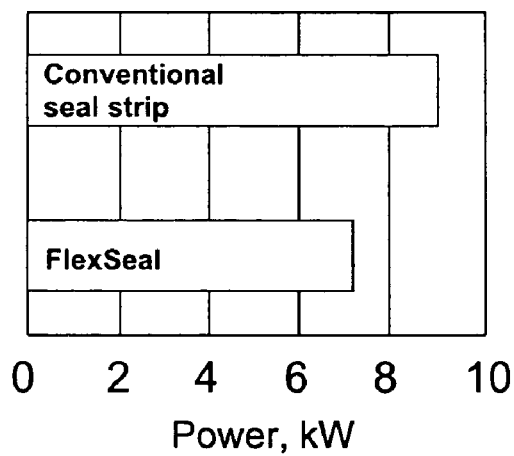
FIG. 3a shows a comparison of the power required by a conventional seal strip and by a seal strip (FlexSeal) according to the invention.
Figure 3B:
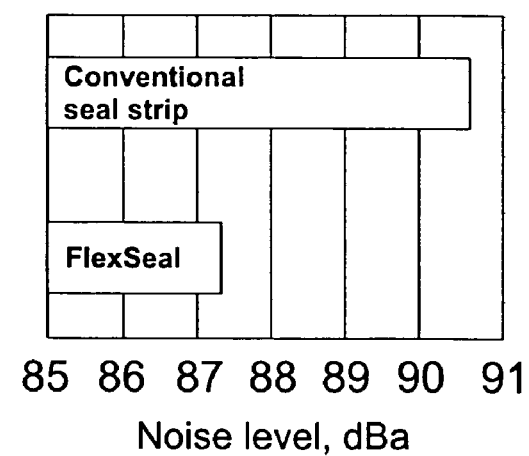
FIG. 3b shows a comparison of the noise levels when using a conventional seal strip and when using a seal strip (FlexSeal) according to the invention.

According to FIG. 3a, the seal strip according to the invention demands less operating power than a conventional seal strip. Similarly, the level of noise production was considerably lower using a seal strip according to the invention compared to a conventional seal strip, FIG. 3b.

Although the invention has been described by reference to specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:

1. A suction roll seal strip, comprising a mixture of more than 50% nitrile rubber and graphite, and said mixture containing wax, the mixture being formed into the suction roll seal strip, wherein the amount of wax is selected such that a seal strip, with a cross-section of 1.9 by 4.8 cm can be rolled onto a reel with a radius of less than 1.5 m, wherein the wax in the mixture has a melting point greater than 100° C., and wherein the mixture includes 1-15% wax by volume.

2. The suction roll seal strip of claim 1 wherein the mixture includes 2-4% wax by volume.

3. The suction roll seal strip of claim 1 wherein the mixture includes an amount of nitrile rubber of 30-60% by volume, and an amount of graphite 30-60% by volume.

4. The suction roll seal strip of claim 1 wherein the mixture includes 1-15% sulphur or peroxide by mass.

5. The suction roll seal strip of claim 1 wherein the graphite in the mixture is natural graphite.

6. The suction roll seal strip of claim 1 wherein the graphite in the mixture is synthetic graphite.

7. The suction roll seal strip of claim 1 wherein the wax in the mixture has a melting point within the range 110-150° C.

8. The suction roll seal strip of claim 1 wherein the wax in the mixture is an ethylene bis-stearamide wax.

9. The suction roll seal strip of claim 8 wherein the wax in the mixture is a N, N'-ethylene bis-stearamide wax.

10. The suction roll seal strip of claim 1 wherein the wax in the mixture is a wax selected from the group consisting of: hydroxy stearamide wax, hydroxy bis-stearamide wax, carnauba wax, esparto wax, polyolefin wax, and amide wax.

11. A suction roll seal strip for placement in a holder of a stationarily supported suction box in a paper machine, the suction box being connected to a vacuum source, and located inside a perforated cylindrical roll which is mounted for rotation around the suction box, wherein the cylindrical roll has an inner surface and wherein the suction box has a gap opening against the cylindrical roll, the suction roll seal strip for positioning within the holder to form a seal between the suction box and the inner surface of the cylindrical roll so that the seal strip wipes against the inner surface of the cylindrical roll as it rotates, the suction roll seal strip comprising: a section of material selected to allow a seal strip with a cross-section of 1.9 cm by 4.8 cm to be bent into a reel with a radius of less than 150 cm, wherein the seal strip is comprised of a mixture of more than 50% nitrile rubber and graphite, and contains wax, wherein the wax in the mixture has a melting point within the range of 110-150° C.

12. The suction roll seal strip of claim 11 wherein the mixture includes 1-15% wax by volume.

13. The suction roll seal strip of claim 11 wherein the wax in the mixture is a wax selected from the group consisting of: ethylene bis-stearamide wax, hydroxy stearamide wax, hydroxy bis-stearamide wax, carnauba wax, esparto wax, polyolefin wax, and amide wax.

* * * * *

UNITED STATES PATENT AND TRADEMARK OFFICE
CERTIFICATE OF CORRECTION

PATENT NO. : 7,569,265 B2 Page 1 of 1
APPLICATION NO. : 10/774084
DATED : August 4, 2009
INVENTOR(S) : Boga et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1170 days.

Signed and Sealed this

Seventh Day of September, 2010

David J. Kappos
*Director of the United States Patent and Trademark Office*